United States Patent
Obeda et al.

(10) Patent No.: US 7,248,798 B2
(45) Date of Patent: *Jul. 24, 2007

(54) METHOD AND SYSTEM FOR IDENTIFICATION OF CHANNELS IN AN OPTICAL NETWORK

(75) Inventors: Paul David Obeda, Ottawa (CA); Derrick Remedios, Ottawa (CA); Ping Wai Wan, Ottawa (CA); Colin Geoffrey Kelly, Ottawa (CA)

(73) Assignee: Tropic Networks Inc., Ottawa (CA)

( * ) Notice: Subject to any disclaimer, the term of this patent is extended or adjusted under 35 U.S.C. 154(b) by 867 days.

This patent is subject to a terminal disclaimer.

(21) Appl. No.: 10/259,290

(22) Filed: Sep. 30, 2002

(65) Prior Publication Data
US 2004/0062549 A1    Apr. 1, 2004

(51) Int. Cl.
*H04B 10/08* (2006.01)
*H04B 10/12* (2006.01)
*H04B 10/04* (2006.01)

(52) U.S. Cl. .................... 398/32; 398/28; 398/141; 398/200; 398/33

(58) Field of Classification Search .................. 398/79, 398/193, 19, 8, 212, 31, 1, 83, 32, 9, 33, 398/28, 141, 200; 375/340, 208, 376; 359/337, 359/12; 385/2, 4, 8; 379/220, 229; 370/465, 370/529; 455/71
See application file for complete search history.

(56) References Cited

U.S. PATENT DOCUMENTS

| | | | |
|---|---|---|---|
| 2003/0067646 A1* | 4/2003 | Wan et al. | 359/124 |
| 2003/0067647 A1* | 4/2003 | Wan et al. | 359/124 |
| 2003/0067651 A1* | 4/2003 | Wan et al. | 359/133 |
| 2004/0062548 A1* | 4/2004 | Obeda et al. | 398/25 |

FOREIGN PATENT DOCUMENTS

| | | |
|---|---|---|
| EP | 0 782 279 A2 | 7/1997 |
| WO | WO 99 33200 | 7/1999 |

OTHER PUBLICATIONS

Pedersen et al., WO 99/33200 A (DSC Communications As (DK)) Jul. 1, 1999.*

* cited by examiner

*Primary Examiner*—Dalzid Singh
(74) *Attorney, Agent, or Firm*—Victoria Donnelly (57) ABSTRACT

A method and system for identification of a channel in an optical network is provided. The channel is identified by the use of unique combinations of two or more low frequencies, or tones, modulated onto the channel and optionally, a network parameter associated with the channel.

24 Claims, 8 Drawing Sheets

| Block1 | Block2 | Block3 | Block4 | Block5 | Block6 | Block7 | Block8 | Block9 | Block10 | Block11 | Block12 | Block13 | Block14 | Block15 | Block16 | Block17 | Block18 | Block19 | Block20 | Corresp Pool |
|---|---|---|---|---|---|---|---|---|---|---|---|---|---|---|---|---|---|---|---|---|
| x | x | x | x | 5 | 9 | 13 | 17 | 21 | 25 | 29 | 33 | 37 | 41 | 45 | 49 | 53 | 57 | 61 | 65 | Pool1 69-104 |
| x | x | x | 1 | 105 | 109 | 113 | x | x | x | x | x | x | x | x | x | x | x | x | x | Pool2 117-152 |
| x | 381 | x | x | x | 153 | 157 | 161 | 165 | 169 | 173 | 177 | 181 | 185 | 189 | 193 | 197 | 201 | 205 | 209 | Pool3 213-248 |
| 289 | x | 429 | x | x | x | 249 | 293 | 297 | 301 | 305 | 309 | 313 | 317 | 321 | 325 | 329 | 333 | 337 | x | Pool4 253-288 |
| x | 513 | x | x | x | x | x | x | 385 | x | 437 | 441 | 445 | 449 | 453 | 457 | 461 | 465 | 469 | 341 | Pool5 345-380 |
| 425 | x | 565 | x | 569 | x | x | x | x | 433 | x | x | x | x | x | x | x | x | x | x | Pool6 389-424 |
| x | 645 | x | 517 | x | 653 | x | x | x | x | 521 | x | x | x | x | x | x | x | x | 473 | Pool7 477-512 |
| 561 | x | 721 | x | 725 | x | 729 | x | x | x | x | 573 | 577 | 581 | 585 | 589 | 593 | 597 | 601 | 605 | Pool8 525-560 |
| x | 797 | x | 649 | x | 805 | x | 809 | x | x | x | x | 657 | 661 | 665 | 669 | 673 | 677 | x | x | Pool9 609-644 |
| 717 | x | 873 | x | 877 | x | x | x | x | x | x | x | x | 733 | 737 | 741 | 745 | 749 | 753 | 757 | Pool10 679-716 |
| x | 945 | x | 801 | x | x | 881 | 957 | 885 | x | x | x | x | x | x | x | x | 825 | 829 | x | Pool11 761-796 |
| 869 | x | 1021 | x | 1025 | 953 | 1029 | x | 1033 | 961 | 1037 | x | x | x | x | 817 | 821 | x | x | x | Pool12 833-868 |
| x | 1069 | 1093 | 949 | x | 1101 | x | 1105 | x | x | x | 1113 | x | x | x | x | 889 | 893 | 897 | 901 | Pool13 909-944 |
| 1017 | x | 1169 | 1097 | 1177 | x | 1181 | 1185 | 1189 | 1109 | x | 1201 | 1205 | x | x | x | x | x | x | 905 | Pool14 981-1016 |
| x | 1165 | 1257 | 1173 | 1265 | 1269 | x | 1273 | 1277 | 1281 | 1285 | 1289 | 1293 | 1297 | x | x | x | 969 | 973 | 977 | Pool15 1053-1088 |
| 1161 | 1253 | 1345 | 1261 | 1353 | 1357 | 1361 | 1365 | 1369 | 1373 | 1377 | 1381 | 1385 | 1389 | 1393 | x | x | x | x | 1049 | Pool16 1125-1160 |
| 1249 | 1341 | 1441 | 1349 | 1449 | 1453 | 1457 | 1461 | 1465 | 1469 | 1473 | 1477 | 1481 | 1485 | 1489 | 1493 | x | x | 1117 | 1121 | Pool17 1213-1248 |
| 1337 | 1437 | 1541 | 1445 | 1549 | 1553 | 1557 | 1561 | 1565 | 1569 | 1573 | 1577 | 1581 | 1585 | 1589 | 1593 | 1597 | 1041 | 1045 | 1209 | Pool18 1301-1336 |
| 1433 | 1537 | x | 1545 | x | x | x | x | x | x | x | x | x | x | x | x | x | x | x | x | Pool19 1397-1432 |
| 1533 | x | x | x | x | x | x | x | x | x | x | x | x | x | x | x | x | x | x | x | Pool20 1497-1532 |
|  |  |  |  |  |  |  |  |  |  |  |  |  |  |  |  |  |  |  |  | (end) |

METHOD AND SYSTEM FOR IDENTIFICATION OF CHANNELS IN AN OPTICAL NETWORK

FIELD OF THE INVENTION

The invention relates to optical networks, and, in particular, to the method and system for identification of channels in an optical network.

BACKGROUND OF THE INVENTION

As communications networks become more complex, the task of network management becomes increasingly difficult. An important aspect of network management is an identification and accurate record of optical channels in the network, and knowledge of the allocation of channels to the network elements, e.g., to optical links. This may involve knowledge of the allocation of channels to respective optical fibers and optical band filters within the nodes.

One of the common methods for the identification of a channel in an optical network is to modulate the channel with a low frequency tone, where the tone uniquely identifies the channel wavelength in the network. A network management server (NMS) associated with network nodes is responsible for mapping each channel with a unique tone, and for keeping track of tones available for channel identification.

However, due to the limited number of tones that can be released in a network, this method may not be suitable for large networks having a large number of optical channels and/or when additional information about the network components needs to be carried with the channel, or, e.g., when tone allocation is accompanied by certain restrictions.

Therefore, a need exists in the industry for the development of an improved method for channel identification which would be flexible, cost-efficient and reliable, while suitable for channel ID in large networks and/or providing additional information about the network, especially when certain restrictions are imposed on the tone allocation in the network.

SUMMARY OF THE INVENTION

It is therefore an object of the invention to provide channel identification in an optical network that would avoid or minimize the above-mentioned drawbacks.

According to one aspect of the invention there is provided a method for identifying an optical channel in an optical network, comprising the steps of marking the channel with a unique combination of two or more identification tags, the combination of identification tags being referred to as a channel signature, to identify the channel in the network, and detecting the channel signature at various locations in the network. Preferably, the identification tags are encoded onto the channel, and the identification tags are low frequency dither tones. The step of modulating with the tones beneficially comprises one of the following types of modulation: amplitude modulation, frequency modulation, phase modulation, and polarization modulation. Conveniently, the tones are modulated onto the channel either simultaneously or consecutively, or the tones are modulated onto the channel using combinations of simultaneous and consecutive modulation.

Advantageously, the method further comprises the step of verifying one or more restrictions imposed on the allocation of tones for the channel signature in the network, the step of verifying being performed before the step of marking. The verification step beneficially comprises verifying that the tones in the channel signature are selected so that the frequency difference between any two tones in the channel signature is not less than a predetermined frequency spacing. Due to restrictions imposed by the current technology used by decoders in used today, this predetermined frequency spacing is from, but not restricted to, a range of frequency spacings from about 1 Hz to about 100 Hz, preferably from about 8 Hz to about 10 Hz, but any frequency spacing may be used such that the tones may be reliably decoded. Gainfully, the step of verifying the restrictions comprises verifying that channel signatures for different channels in the network are chosen so that, for any number of channels destined to the same decoder in the network where the tones are detected, a list of individual tones used in the channel signatures of said channels includes each tone only once.

Beneficially, the method further comprises the steps of maintaining a list of all tones to be used for channel signatures in the network, releasing tones in unique combinations for use as channel signatures in the network, and keeping track of tones available for further allocation to channel signatures in the network.

There is also provided a system for identifying an optical channel in an optical network, comprising means for marking the channel with a unique combination of two or more identification tags, the combination of identification tags being referred to as a channel signature, to identify the channel in the network, and means for detecting the channel signature at various locations in the network. The means for marking the channel usefully comprises an encoder for encoding two or more low frequency dither tones onto the optical channel, and the means for detecting comprises a decoder for decoding said low frequency dither tones from the optical channel. Usefully, the encoder includes means for modulating the tones onto the channel either simultaneously or consecutively, or modulating the tones onto the channel using combinations of simultaneous and consecutive modulation. Gainfully, the system further comprises means for verifying one or more restrictions imposed on the allocation of tones for the channel signature in the network. The means for verifying advantageously comprises one or more of the following: means for verifying that the tones in the channel signature are selected so that the frequency difference between any two tones in the channel signature is not less than a predetermined frequency spacing, and means for verifying that channel signatures for different channels in the network are chosen so that, for any number of channels destined to the same decoder in the network where the tones are detected, a list of individual tones used in the channel signatures of said channels includes each tone only once. The system further comprises means for maintaining a list of all tones to be used for channel signatures in the network, means for releasing tones in unique combinations for use as channel signatures in the network, and means for keeping track of tones available for further allocation to channel signatures in the network.

There is provided also a method for identifying an optical channel in an optical network, comprising the steps of marking the channel with a unique combination of two or more identification tags, the combination of identification tags being referred to as a channel signature, to uniquely identify the channel in the network and one or more network parameters associated with the channel, and detecting the channel signature at various locations in the network. Usefully, the step of marking comprises modulating the channel with the identification tags, which are low frequency dither tones. Beneficially, the step of marking the channel comprises allocating one of the tones, or, alternatively, two or more of the tones, in the channel signature for identifying the channel, and allocating one or more of the remaining tones in the channel signature for identifying one or more parameters in the network associated with the channel.

The step of allocating the remaining tones in the method gainfully comprises allocating the tones for identifying one or more of the following network parameters associated with the channel: an optical band including the channel, a source node in the network where the channel signature is marked, a destination node in the network where the channel signature is detected, an optical fiber carrying the channel, and an optical cable including the optical fiber carrying the channel. The step of modulating with the tones beneficially comprises one of the following types of modulation: amplitude modulation, frequency modulation, phase modulation, and polarization modulation. Conveniently, the tones are modulated onto the channel either simultaneously or consecutively, or the tones are modulated onto the channel using combinations of simultaneous and consecutive modulation.

Advantageously, the method further comprises the step of verifying one or more restrictions imposed on the allocation of tones for the channel signature in the network, the step of verifying being performed before the step of marking. The verification step beneficially comprises verifying that the tones in the channel signature are selected so that the frequency difference between any two tones in the channel signature is not less than a predetermined frequency spacing. Due to restrictions imposed by the current technology used by decoders in used today, this predetermined frequency spacing is from, but not restricted to, a range of frequency spacings from about 1 Hz to about 100 Hz, preferably from about 8 Hz to about 10 Hz, but any frequency spacing may be used such that the tones may be reliably decoded.

Gainfully, the step of verifying the restrictions comprises verifying that channel signatures for different channels in the network are chosen so that, for any number of channels destined to the same decoder in the network where the tones are detected, a list of individual tones used in the channel signatures of said channels includes each tone only once.

Beneficially, the method further comprises the steps of maintaining a list of all tones to be used for channel signatures in the network, releasing tones in unique combinations for use as channel signatures in the network, and keeping track of tones available for further allocation to channel signatures in the network. Preferably, the channel signature comprises a pair of two dither tones, and one of the tones in the pair is allocated to identify the channel wavelength, and the other tone in the pair is allocated to identify one of the following network parameters: an optical band including the channel, a source node in the network where the channel signature is marked, a destination node in the network where the channel signature is detected, and an optical fiber carrying the channel.

The method further comprises the beneficial step of selecting a plurality of unique pairs of tones, each tone in each pair being selected from a tonespace comprising a limited number of tones, and each pair of tones uniquely identifying the channel and the associated parameter in the network. Usefully, the step of selecting comprises the steps of: partitioning the tonespace into M blocks, each block comprising N tones, and selecting the two tones in the pair from the same block, the tones in the block being used to uniquely identify one channel and the associated parameter in the network.

Beneficially, the step of selecting comprises the steps of: partitioning the tonespace into a first segment and a second segment, and partitioning each segment into M blocks, and selecting one tone in the pair from a block from the first segment, and the other tone in the pair from a block from the second segment.

A system is also provided for identifying an optical channel in an optical network, comprising means for marking the channel with a unique combination of two or more identification tags, the combination of identification tags being referred to as a channel signature, to uniquely identify the channel in the network and one or more network parameters associated with the channel, and means for detecting the channel signature at various locations in the network. The means for marking the channel usefully comprises means for modulating the channel with the identification tags, which are low frequency dither tones. Usefully, the means marking the channel comprises means for allocating one of the tones in the channel signature for identifying the channel, and means for allocating one or more of the remaining tones in the channel signature for identifying one or more parameters in the network associated with the channel. The means for allocating beneficially comprises means for allocating the tones for identifying one or more of the following network parameters associated with the channel: an optical band including the channel, a source node in the network where the channel signature is marked, a destination node in the network where the channel signature is detected, an optical fiber carrying the channel, and an optical cable including the optical fiber carrying the channel.

Advantageously, the means for modulating with the tones comprises means for modulating with one of the following types of modulation: means for amplitude modulation, means for frequency modulation, means for phase modulation, and means for polarization modulation. The encoder usefully includes means for modulating the tones onto the channel either simultaneously or consecutively, or modulating the tones onto the channel using combinations of simultaneous and consecutive modulation.

Advantageously, the system further comprises means for verifying one or more restrictions imposed on the allocation of tones for the channel signature in the network. The means for verification beneficially comprises means for verifying that the tones in the channel signature are selected so that the frequency difference between any two tones in the channel signature is not less than a predetermined frequency spacing. Due to restrictions imposed by the current technology used by decoders in used today, this predetermined frequency spacing is from, but not restricted to, a range of frequency spacings from about 1 Hz to about 100 Hz, preferably from about 8 Hz to about 10 Hz, although it is understood that any frequency spacing may be used such that the tones may be reliably decoded.

Gainfully, the means for verifying the restrictions comprises means for verifying that channel signatures for different channels in the network are chosen so that, for any number of channels destined to the same decoder in the network where the tones are detected, a list of individual tones used in the channel signatures of said channels includes each tone only once.

Additionally, the system further comprises means for maintaining a list of all tones to be used for channel signatures in the network, means for releasing tones in unique combinations for use as channel signatures in the network, and means for keeping track of tones available for further allocation to channel signatures in the network.

Preferably, the means for marking comprises means for marking the channel with the channel signature comprising a pair of two dither tones, and usefully includes means for allocating one of the tones in the pair to identify the channel wavelength, and means for allocating the other tone in the pair to identify one of the following network parameters: an optical band including the channel, a source node in the network where the channel signature is marked, a destination node in the network where the channel signature is detected, and an optical fiber carrying the channel. Advantageously, the system further comprises means for selecting a plurality of unique pairs of tones, each tone in each pair being selected from a tonespace comprising a limited number of tones, and each pair of tones uniquely identifying the channel and the associated parameter in the network. The means for selecting usefully comprises means for partitioning the tonespace into M blocks, each block comprising N tones, and means for selecting the two tones in the pair from the same block, the tones in the block being used to uniquely identify one channel and the associated parameter in the network. Beneficially, the means for selecting comprises means for partitioning the tonespace into a first and second segments, means for partitioning each segment into M blocks, and means for selecting one tone in the pair from a block from the first segment, and the other tone in the pair from a block from the second segment.

Thus, a method and system are described that provide a cost effective and reliable solution for identification of a relatively large number of channels in an optical network, while supplementing it with additional information about other parameters in the network associated with the channel.

BRIEF DESCRIPTION OF THE DRAWINGS

Embodiments of the invention will now be described with reference to the accompanying drawings in which:

FIG. 7 is a table showing allocation of tones in the tonespace in the method of FIG. 6.

DETAILED DESCRIPTION OF THE PREFERRED EMBODIMENTS

Figure 1:
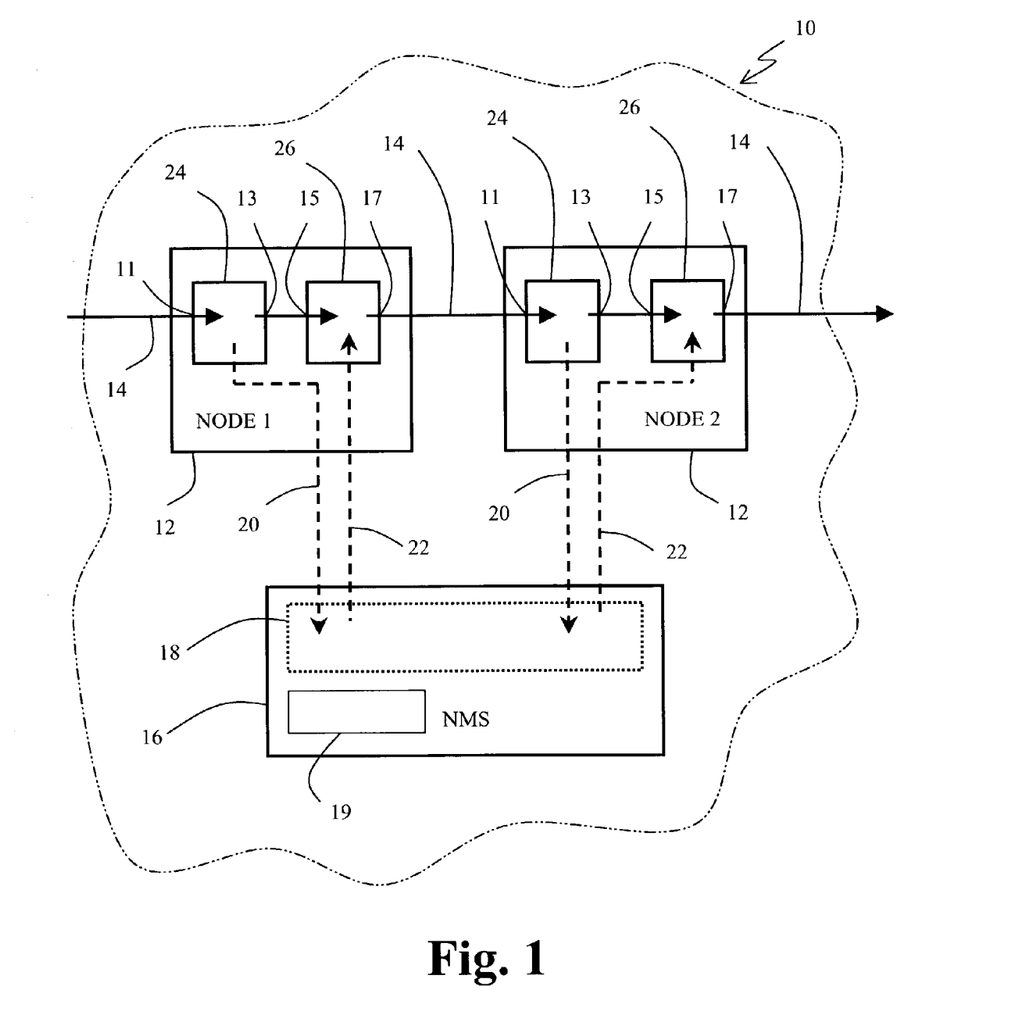
FIG. 1 shows an optical communications network for illustrating methods for identification of optical channels in an optical network according to embodiments of the invention.

A simple network configuration for illustrating methods for identification of an optical channel (optical wavelength) in an optical network according to the embodiments of the invention is shown in FIG. 1. An optical channel is marked with a unique combination of two or more low frequency signals, hereinafter called tones or dither tones, which are selected from a set of tones available for channel identification. Typically, the tones are of a low frequency, for example in a range from about 1 kHz to about 100 kHz. The set of tones released in a network and available for channel identification is called the tonespace. The unique combination of two or more tones chosen from the tonespace will be referred to as channel signature. Since the number of combinations of two or more tones in the tonespace is far greater than the number of single tones in the tonespace, a relatively large number of unique channel signatures may be selected for the identification of channels in the network.

Referring to FIG. 1, a simple optical communications network 10 is illustrated, comprising a plurality of, in this example two, nodes 12, identified individually as Node 1 and Node 2, which are coupled together via an optical communications path 14, e.g., an optical fiber, carrying a plurality of optical channels. Each of the nodes 12 comprises a form of decoder 24 having input 11 and output 13 for decoding low frequency tones from the optical channels, and an encoder 26 having input 15 and output 17 for encoding low frequency tones onto the optical channels. The network 10 also includes a network management system (NMS) 16, to which all of the decoders 24 and encoders 26 on the nodes 12 are coupled via communications paths 20, 22 represented by dashed lines. The NMS 16 has a memory 18 for storing the allocation of tones in the network, and a processing unit 19 which is responsible for assigning unique combinations of tones and keeping track of tones available for further allocation to channel signatures in the network. The communications paths 20, 22 can be optical or other types (e.g. electrical) of communications paths.

Identification of a channel is performed as follows. The decoder 24 decodes one or more tones modulated onto the channel carried by the communications path 14, and communicates the tones to the NMS 16 via communications path 20. The NMS 16 looks up the unique combination of tones, which represents the channel signature, in a table in the memory 18 and thus maps the combination of tones onto the channel.

Similarly, to modulate a channel with a channel signature, the NMS 16 looks up the channel in a table in the memory 18, maps the channel into the unique combination of tones, and sends the tones to the encoder 26 via communications path 22, where the tones are encoded onto the optical channel carried by the optical communications path 14.

As is known in the art, such a communications network may include an arbitrary number of nodes 12 and NMSs 16, which may be located together or separately from one another, with various arrangements of communications paths 14 between the nodes 12, and NMSs 16 having the desired configuration or topology. Furthermore, such a communications network may be coupled to other similar or different communications networks in various manners. Accordingly, FIG. 1 serves to illustrate a simple form of a network for the purposes of describing embodiments of the invention.

Figure 2:
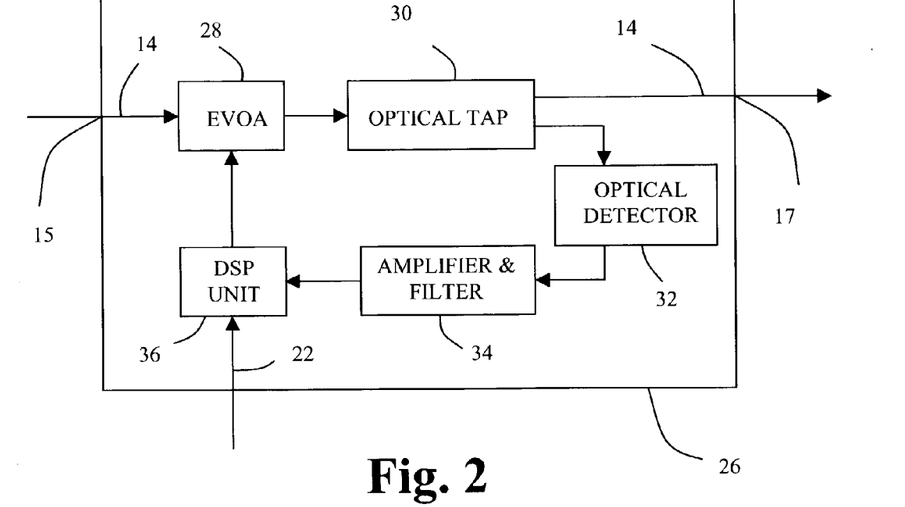
FIG. 2 is an illustration of one form of an encoder for modulating tones onto an optical channel within a node of the network of FIG. 1.

FIG. 2 illustrates one form of encoder 26 which can be used within nodes 12.

Referring to FIG. 2, an optical channel to be provided with a unique channel signature is supplied to the encoder 26 via an optical path 14 at the input 15 of the encoder 26, an electronic variable optical attenuator (EVOA) 28, and an optical tap 30 to an output optical path 14 at the output 17 of the encoder. A small portion, e.g. 4%, of the optical channel which is tapped by the optical tap 30, is detected by an optical detector 32, whose electrical output is amplified and filtered by an Automatic Gain Control (AGC) amplifier and filter unit 34, an output of which is supplied to a digital signal processor (DSP) unit 36. The DSP unit 36 provides a controlled voltage bias to the EVOA 28 in accordance with a respective tone for the optical channel, with which the DSP unit 36 is supplied for example from the NMS 16 via the communications path 22. The encoder of FIG. 2 can modulate the optical channel with a desired amplitude modulation depth, for example of about 1% to about 4%, at frequencies up to about 1 MHz, to provide the desired form of modulation on the optical signal.

Figure 3:
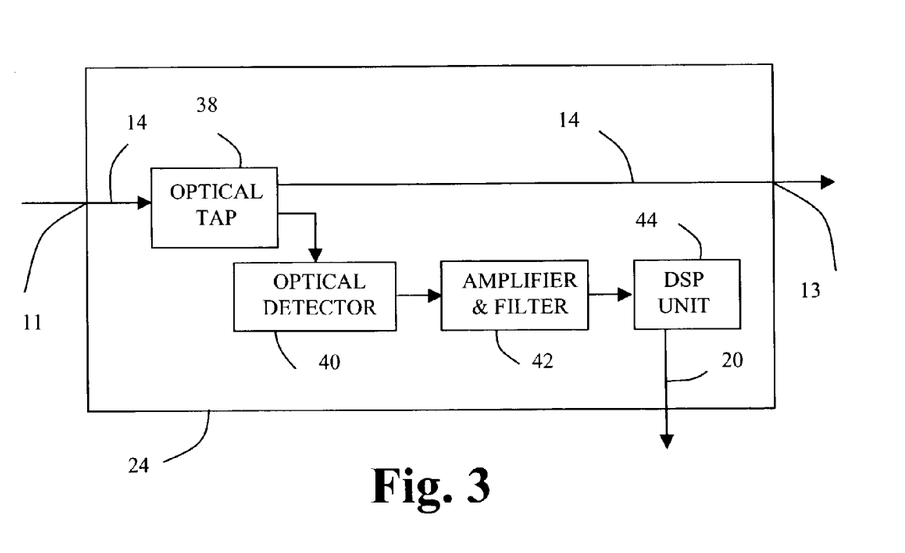
FIG. 3 illustrates one form of a decoder for decoding tones from an optical channel within a node of the network of FIG. 1.

FIG. 3 illustrates one form of the decoder 24 which can be used within nodes 12.

Referring to FIG. 3, an optical channel on an optical path 14 is supplied at the input 11 of the decoder 24 and to an optical tap 38 to an output optical path 14 at the output 13 of the decoder 24. A small portion, e.g. 4%, of the optical channel which is tapped by the optical tap 38 is detected by an optical detector 40, whose electrical output is amplified and filtered by an AGC amplifier and filter unit 42, an output of which is supplied to a DSP unit 44. The DSP unit 44 derives the tones that are present in the optical channel and provides these as an output to the NMS 16 via a communications path 20. The NMS 16 maps the unique combination of tones into a channel.

The forms and functions of the DSP units 36 and 44 depend on the particular form of tones used. For example, the DSP unit 36 may incorporate a digital synthesizer and the DSP unit 44 may incorporate a Fast Fourier Transform (FFT) or Discrete Fourier Transform (DFT) function for detecting tones.

In the embodiments of the invention, the tonespace will comprise 1600 tones available for use in channel signatures. However, it is understood that this value is chosen for illustrative purposes only, and any suitable number of tones in the tonespace may be used as required.

Figure 4A:
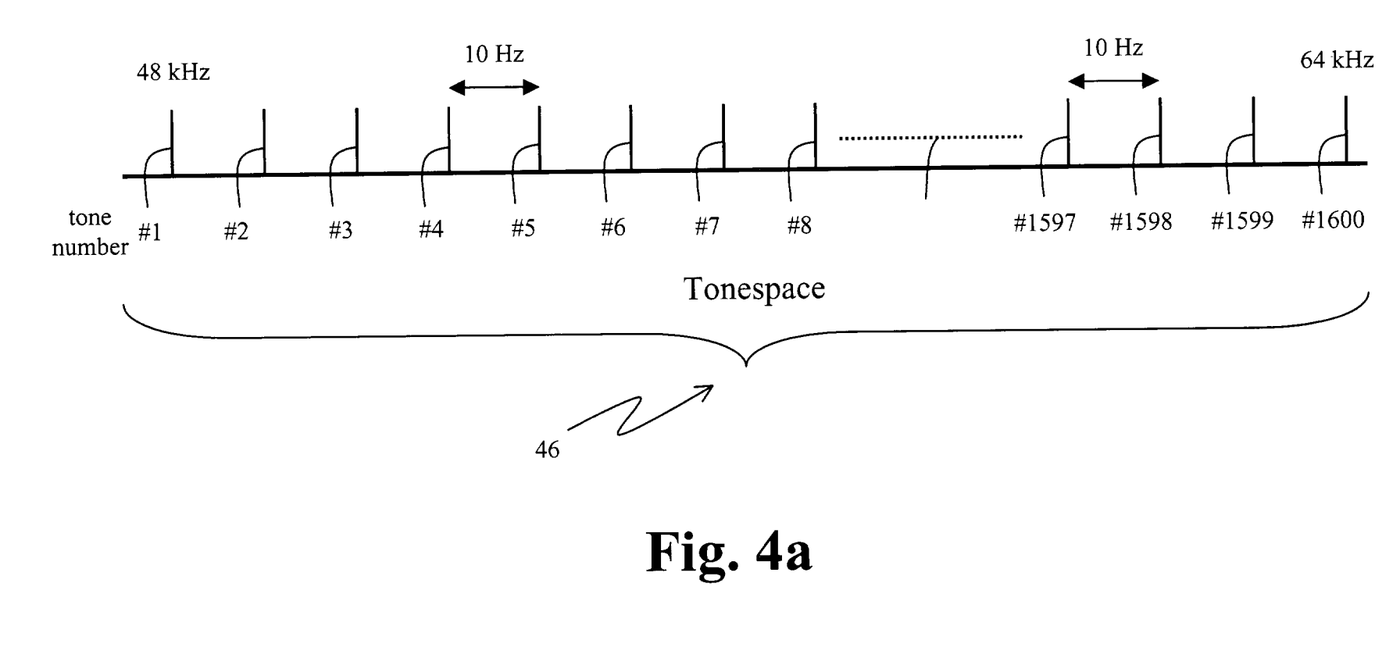
FIG. 4a illustrates a tonespace used in the embodiments of the invention and correspondence between tone frequencies and tone numbers within the tonespace.

One or more restrictions may be imposed on the choice of tones used to generate a channel signature for identifying a channel in the network. Typically, the NMS performs the necessary step of verifying the restrictions imposed on the choice of tones before the channel is marked with the channel signature. The set of 1600 tones 46 in the tonespace of the embodiments of the invention is in the range between 48 kHz and 64 kHz, with a predetermined frequency spacing of 10 Hz between the tones. Thus, the frequency of any tone in the tonespace will be (48000+(tonenumber*10)) Hz, where "tonenumber" represents the ordinal number of the tone, for example, the first tone, second tone, and so on, in the tonespace, as illustrated in FIG. 4a.

Figure 4B:
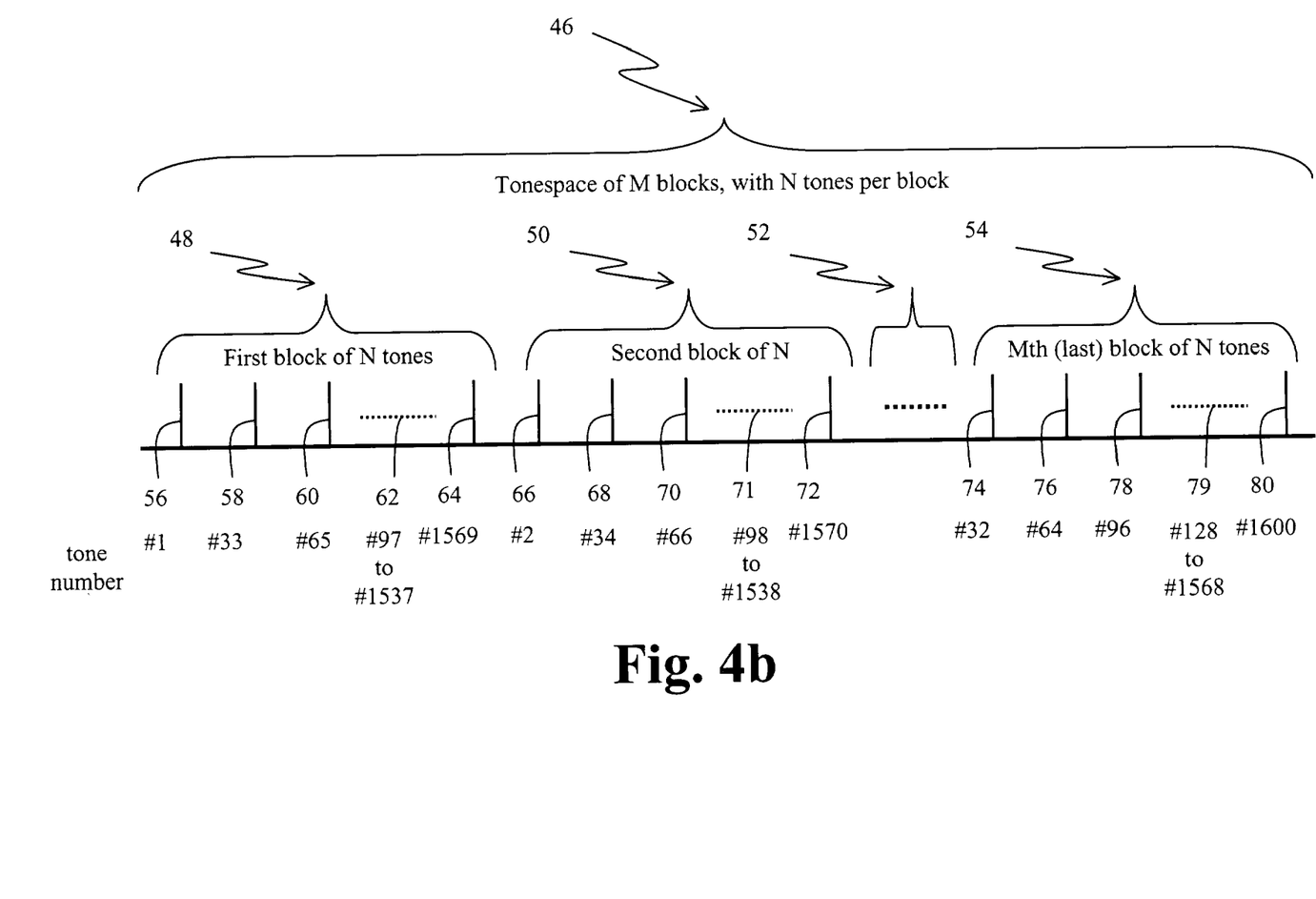
FIG. 4b illustrates partitioning of tones in the tonespace used in a method for identification of channels according to a first embodiment of the invention.

FIG. 4b illustrates partitioning of tones in the tonespace used in the method of identification of channels according to the first embodiment of the invention. The tonespace 46 of 1600 tones comprises M=32 blocks, each block including N=50 tones and being used for identification of 32 channels in the network (channel 1 to channel 32). The first block, labelled 48 in FIG. 4, comprises N=50 tones, where the first tone in the first block is labelled 56, the second tone labelled 58, the third tone labelled 60, tones 4 to 49 are indicated by a dotted line and labelled 62, and the last (50th) tone in the first block is labelled 64. Similarly, the second block of N=50 tones is labelled 50, where the first tone in the second block is labelled 66, the second tone labelled 68, the third tone labelled 70, the fourth to the 49th tones are indicated by a dotted line and labelled 71, and the last (50th) tone in the second block is labelled 72. Blocks 3 to block 31 are indicated by a dotted line and labelled 52. The last (Mth) block of N=50 tones is labelled 54, where the first tone in the last block is labelled 74, the second tone labelled 76, the third tone labelled 78, tones 4 to tone 49 are indicated by a dotted line and labelled 79, and the last (50th) tone in the last block is labelled 80. The tones in the first block 48 are used to generate a channel signature for channel 1, the tones in the second block 50 are used to generate a channel signature for channel 2, and so on.

The frequencies of tones in each block are chosen as follows. In the first block (M=1), the first tone 56 is the first tone in the tonespace 46, or tone #1, and is equivalent to a frequency of 48000 Hz. The second tone 58 in the first block is tone #33, which is 32 tones higher than the first tone 56, the third tone 60 is tone #65, which is 32*2 tones higher than the first tone, and so on, and the last tone 64 in the first block is tone #1569, which is (32*49) tones higher than the first tone 56. In the second block 50 (M=2), the first tone 66 is the second tone in the tonespace 46, or tone #2, the second tone 68 is 32 tones higher than the first tone 66 or tone #34, and so on, and the last tone 72 in the second block 50 is (32*49) tones higher than the first tone, or tone #(2+(32*49))=tone #1570. The summary lists of tones used in blocks M=1 to 3 and block M=32, which are used to identify channels 1 to 3 and channel 32, respectively, are illustrated in Table 1.

TABLE 1

| Channel | lists of tones |
| --- | --- |
| 1 | 1, 33, 65, 97, . . . , 1505, 1537, 1569 |
| 2 | 2, 34, 66, 98, . . . , 1506, 1538, 1570 |
| 3 | 3, 35, 67, 99, . . . , 1507, 1539, 1571 |
| 32 | 32, 64, 96, 128, . . . , 1536, 1568, 1600 |

For example, the first three tones used for identification of channel 1 are tones #1, #33, #65, and the first three tones used for identifying channel 32 are tones #32, #64 and #96. As mentioned above, a list of all tones to be used for channel signatures in the network is maintained by the NMS. The NMS also performs the necessary steps of releasing tones in unique combinations for use as channel signatures, and keeping track of tones available for further allocation to channel signatures in the network.

To encode a channel, a channel signature is chosen by the NMS by selecting a pair of tones from the block that corresponds to the channel. The number of pairs available for each channel is calculated by the combinatoric function (50 CHOOSE 2) or $C_{50}^2$, which is equivalent to (50!/(50-2)!2!), or 1225 tone pairs. Table 2 illustrates examples of tone pairs that uniquely identify channels 1 to 3 and channel 32 in the network, the tones in the tone pair being selected from the summary lists for corresponding channels from Table 1. For example, the tones pairs (1,33) and (1,65) may be used to uniquely identify two instances of channel 1 passing through, e.g., two different optical fiber links in the network.

TABLE 2

| Channel | Example Tone pairs |
| --- | --- |
| 1 | (1, 33), (1, 65), (1, 97), . . . , (1505, 1537), (1537, 1569) |
| 2 | (2, 34), (2, 66), (2, 98), . . . , (1506, 1538), (1538, 1570) |
| 3 | (3, 35), (3, 67), (3, 99), . . . , (1507, 1539), (1539, 1571) |
| 32 | (32, 64), (32, 96), (32, 128), . . . , (1536, 1600), (1568, 1600) |

At the beginning point, or origin, of each identifiable optical link in the network is placed an encoder, which modulates the channel signature, comprising the unique combination of tones, onto the optical channel. Since each encoder in the network is connected to only one decoder at the destination of the optical link, the channel signature may be used not only to uniquely identify the channel, but also to identify the optical link carrying the channel, and/or the origin and destination of the optical link carrying the channel.

Additionally, the described method of allocation of tones into tone pairs guarantees that the tones within each pair used for channel identification are separated within the pair by at least 32 frequency spacings, or at least (32*10) Hz=320 Hz. This ensures a reduced interference of tones within each pair due to effects such as leakage, which could otherwise result in errors in tone detection, especially when the decoder has limited frequency resolution. As a result, reliability of detection of tones in the network is enhanced.

Thus, a reliable method is provided for identification of channels in an optical network that can identify the required number of channels and other network components, such as optical links carrying the channel.

When allocating channel signatures for identification of optical channels in the network, preferably the combinations of tones in the pairs used for indentifying the same channel are chosen so that each tone is not used in more than one pair. Different channel signatures may be used for identification of the same channel in association with other parameters in the network, e.g., links or fiber sections carrying the channel. For example, consider the allocation of the channel signature (1,33) to a first optical link carrying channel 1, and (65,33) to a second optical link carrying channel 1. In this case, both channel signatures are unique, but both of them use the same tone, tone #33, in the channel signature. If a fault occurs in the network causing a decoder to detect only one tone, for example tone #33, then it is not possible to determine if the channel was carried by the first optical link or the second optical link. However, if channel signatures are allocated so that tones are not reused, then it is possible to determine the optical link, or other network component associated with the channel even though one of the tones cannot be decoded, thus increasing reliability of performance monitoring in the network.

Additionally, when allocating channel signatures for identification of optical channels, combinations of tones in the pairs have to be chosen so that, for channels destined to the same decoder in the network, a list of individual tones used in the channel signatures of these channels includes each tone only once. It prevents "collision" of channel signatures for different channels and ensures that channels are reliably detected by the decoder.

Figure 4C:
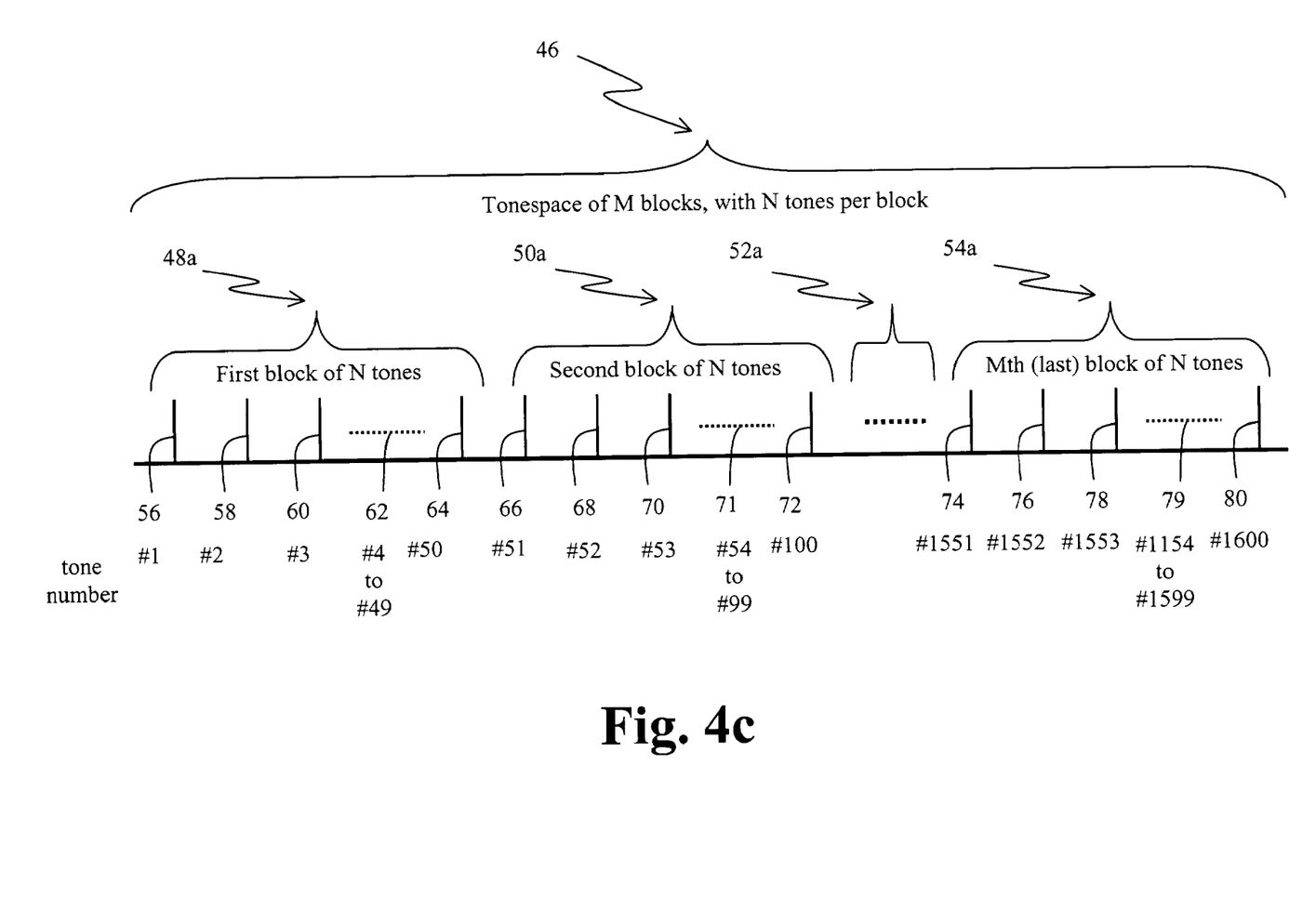
FIG. 4c illustrates partitioning of tones in the tonespace used in a method for identification of channels according to a second embodiment of the invention.

In the method of identification of channels in an optical network according to a second embodiment of the invention as illustrated in FIG. 4c, the tonespace 46 of 1600 tones is also partitioned into M=32 blocks of N=50 tones, the tones in each block being used for the identification of one of the M=32 channels in the network. Similar elements in FIGS. 4b and 4c are labelled by the same reference numerals, with the addition of the letter "a" in FIG. 4c. In this method, the tones in each block are chosen as follows. In the first block 48a, the first tone 56a is the first tone in the tonespace, or tone #1, which is equivalent to a frequency of 48000 Hz. The second tone 58a is the second tone in the tonespace, or tone #2, the third tone 60a is tone #3, and so on, and the last tone 60a in the first block is tone #50. The tones in the second block 50a are the next 50 tones in the tonespace, namely tones #51 to tone #100, and so on, and the tones in the last (Mth) block 54a are the last 50 tones in the tonespace, which are tones #1551 to tone #1600. The lists of tones used in blocks 1 to 3 and block 32 used for identifying channels 1 to 3 and channel 32 respectively are illustrated in Table 3.

TABLE 3

| Channel | Summary list of tones |
| --- | --- |
| 1 | 1, 2, 3, . . . , 48, 49, 50 |
| 2 | 51, 52, 53, . . . , 98, 99, 100 |
| 3 | 101, 102, 103, . . . , 148, 149, 150 |
| 32 | 1551, 1552, 1553, . . . , 1598, 1599, 1600 |

For example, the first three tones in the list used for identifying a channel 1 are tones #1, #2 and #3, and the first three tones in the list used for identifying channel 32 are tones #1551, #1552, and #1553.

To identify a channel in the network, a channel signature is chosen by selecting a pair of tones from the block that corresponds to the channel. Table 4 illustrates some exemplary choices of tone pairs to identify channels 1 to 3 and channel 32, respectively.

TABLE 4

| Channel | Example Tone pairs |
| --- | --- |
| 1 | (1, 2), (1, 3), (1, 4), . . . , (48, 50), (49, 50) |
| 2 | (2, 34), (2, 66), (2, 98), . . . , (98, 100), (99, 100) |
| 3 | (3, 35), (3, 67), (3, 99), . . . , (148, 150), (149, 150) |
| 32 | (32, 64), (32, 96), (32, 128), . . . , (1598, 1600), (1599, 1600) |

For example, two channel signatures for channel 1 may be the pairs of tones (1,2) and (1,3). The number of pairs of tones available for each channel is calculated by the combinatoric function $C_{50}^2$=(50 CHOOSE 2), which evaluates to 1225 tone pairs. Pairs of tones associated with a particular channel in the network are used to identify different instances of the channel in the network, e.g., each pair of tones associated with the channel may be used for a specified section of the network, e.g., an optical fiber, or alternatively it may be used to identify an encoder where the tones were modulated onto the channel or to identify another element or parameter in the network. In this way, a simple method is provided for identification of a channel and an associated network parameter in an optical network.

Figure 5:
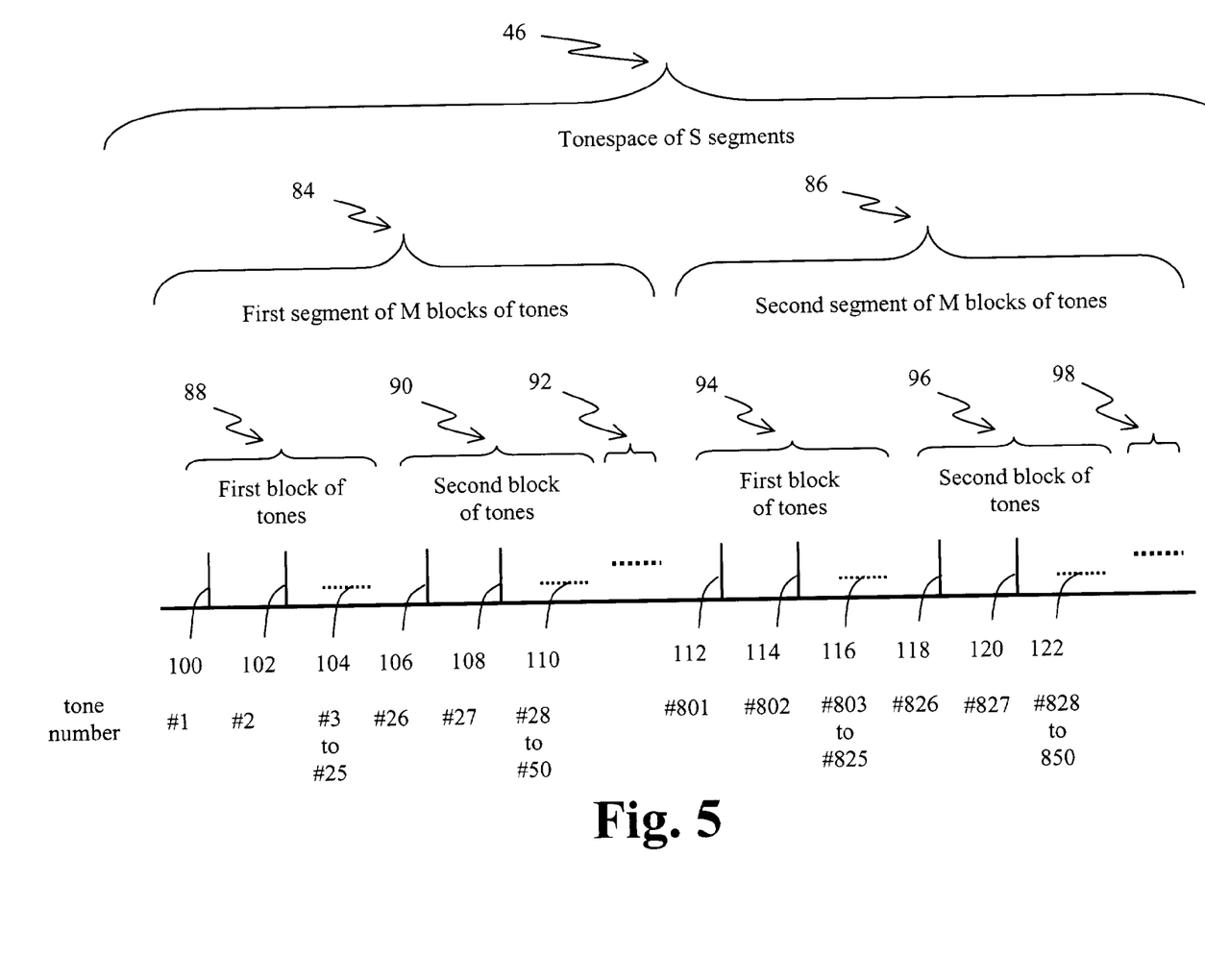
FIG. 5 illustrates partitioning of tones in the tonespace used in a method for identification of channels according to a third embodiment of the invention.

FIG. 5 illustrates the partition of tones used in a method for identification of channels in an optical network according to a third embodiment of the invention. In the third embodiment, the tonespace 46 of 1600 tones is partitioned into a S=2 segments of 800 tones, labelled 84 and 86, and each segment of the tonespace comprises M=32 blocks of N=25 tones, some of the blocks being shown and labelled 88 to 98 in FIG. 5. The first block in the first segment 84 is labelled 88, the second block in the first segment 84 is labelled 90, and blocks 3 to 32 in the first segment 84 are indicated by a dotted line and labelled 92. The first block in the second segment 86 is labelled 94, the second block in the second segment 86 is labelled 96, and blocks 3 to 32 in the second segment 86 are indicated by a dotted line and labelled 98. The tones in the first block 88 in the first segment 84 are the first 25 tones in the tonespace 46 shown as in FIG. 1, comprising tone #1, labelled 100, tone #2, labelled 102, and tones #3 to #25, indicated by a dotted line and labelled 104. The tones in the second block 90 in the first segment 84 are the next 25 tones comprising tone #26, labelled 106, tone #27, labelled 108, and tones #28 to #50, indicated by a dotted line and labelled 110. The tones in the first block 94 in the second segment 86 comprise tone #801, labelled 112, tone #802, labelled 114, and tones #803 to tone #825, indicated by a dotted line and labelled 116. The tones in the second block 96 in the second segment 86 are the next 25 tones, comprising tone #826, labelled 118, tone #827, labelled 120, and tones #828 to #850, indicated by a dotted line and labelled 122. Blocks 3 to 32 in the second segment 86 are indicated by a dotted line and labelled 98.

Channel signatures for the channels are chosen by selecting pairs in the following manner. The first tone in the pair is chosen from one of the blocks in the first segment, the block in the first segment being used for identifying the channel in question only. The second tone in the pair is chosen from the block in the second segment with the same ordinal number as the block used to choose the first tone in the pair, the block in the second segment being used for identifying the channel in question only. For example, if the first tone in the pair is selected from block 88, then the second tone in the pair is chosen from block 94, or alternatively, if the first tone in the pair is chosen from the block 90, then the second tone in the pair is chosen from the block 96. The number of tone pairs available to identify each channel is 625. Table 5 illustrates examples of channel signatures used to identify channels one to three and channel 32, according to the described allocation scheme of the third embodiment.

TABLE 5

| Channel | Example Tone pairs |
| --- | --- |
| 1 | (1, 801), (1, 802), . . . (25, 824), (25, 825) |
| 2 | (26, 826), (26, 827), . . . (50, 849), (50, 850) |
| 3 | (51, 851), (51, 852), . . . (75, 874), (75, 875) |
| 32 | (775, 1575), (775, 1576), . . . (800, 1599), (800, 1600) |

For example, two channel signatures for channel one may be the pairs of tones (1,801) and (1,802), and a channel signature for channel 32 may be (775,1575).

Figure 6A:
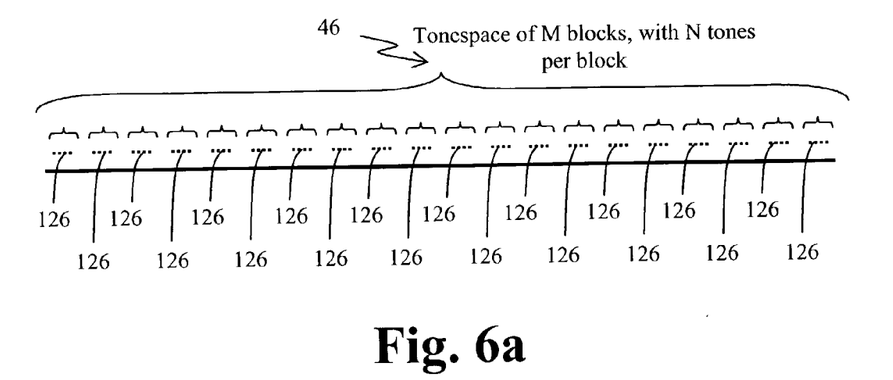
FIGS. 6a, 6b and 6c illustrate partitioning of tones in the tonespace used in a method for identification of channels, according to a fourth embodiment of the invention.
Figure 6B:
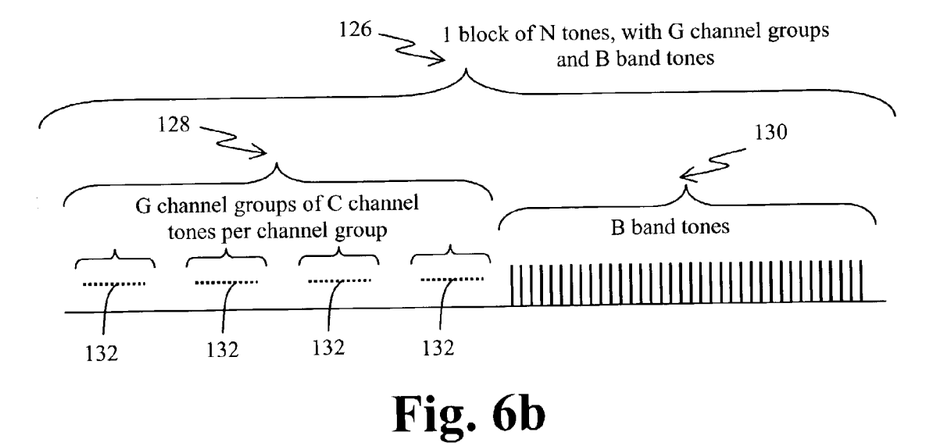
Figure 6C:
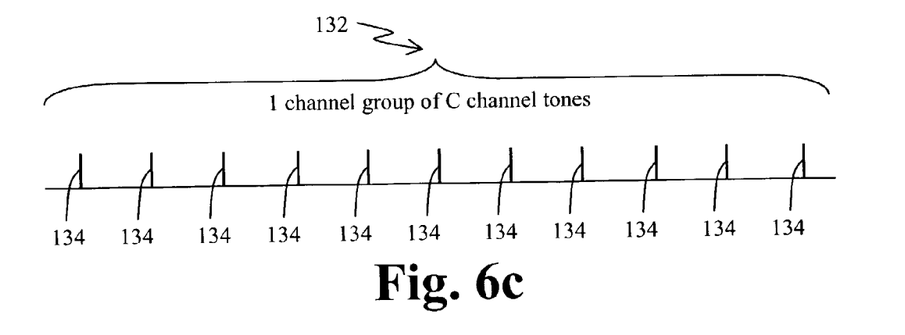

In the method for identification of channels in an optical network according to a fourth embodiment of the invention, the tonespace 46 of 1600 tones comprises M=20 blocks of N=80 tones, where each block corresponds to a band of channels. FIG. 6a illustrating the partition of the tonespace 46 into M blocks, each block indicated by dotted lines and labelled 126. As illustrated in FIG. 6b in more detail, the block 126 comprises two parts, 128 and 130. The first part 128 of block 126 is a set of G=4 channel groups, each indicated by dotted lines and labelled 132, where a channel group is associated with the channel in a band of channels. The second part 130 of the block 126 is a pool of B=36 band tones associated with the band carrying each of the G=4 channels in the channel groups 132. As illustrated in FIG. 6c in more detail, the channel group 132 comprises C=11 channel tones, each labelled 134. In FIG. 6a, 6b and 6c, the values of M, G, B and C have been chosen as 20, 4, 36 and 11, respectively, although any suitable choice of values for M, G, B and C may be used.

A channel signature comprising a pair of tones is chosen in the following manner. The first tone in the pair is chosen from one of the tones 134 in the channel group 132 in the set of channel groups 128 in the block 126 associated with the channel and the band carrying the channel. The first tone in the pair is used to identify the channel only. The second tone in the pair is chosen from the pool of band tones 130 in the same block 126 used to select the first tone. The second tone is used to identify the band carrying the channel only. Table 6 illustrates the list of channel tones for a channel group in a band, and the list of band tones for the band. For example, referring to table 6, to identify channel 1 in band 1, the first tone may be chosen as tone #1 from channel group 1, and the second tone may be chosen as tone #45 from the pool of band tones for band 1.

TABLE 6

| Band | Channel Group | Channel tones | Band Pool Tones |
| --- | --- | --- | --- |
| 1 | 1 | 1, 2, . . . , 11 | 45, 46, 47, . . . , 79, 80 |
| 1 | 2 | 12, 13, . . . , 22 | 45, 46, 47, . . . , 79, 80 |
| 1 | 3 | 23, 24, . . . , 33 | 45, 46, 47, . . . , 79, 80 |
| 1 | 4 | 34, 35, . . . , 44 | 45, 46, 47, . . . , 79, 80 |
| 2 | 1 | 81, 82, . . . , 91 | 125, 126, 127, . . . , 159, 160 |
| 2 | 2 | 92, 93, 94, . . . , 102 | 125, 126, 127, . . . , 159, 160 |
| 20 | 1 | 1521, 1522, . . . , 1531 | 1545, 1546, 1547, . . . , 1599, 1600 |

In this way, each channel signature identifies a channel and the band carrying the channel. Table 7 illustrates some examples of channel signatures for channels one to four in band one, channels one to two in band two, and channel one in band four.

TABLE 7

| Band | Channel | Example tone pairs |
| --- | --- | --- |
| 1 | 1 | (1, 45), (2, 45) |
| 1 | 2 | (12, 46), (13, 49) |
| 1 | 3 | (23, 80), (24, 52) |
| 1 | 4 | (34, 45), (35, 80) |
| 2 | 1 | (81, 125), (82, 126) |
| 2 | 2 | (92, 127), (93, 128) |
| 4 | 1 | (775, 1575), (800, 1600) |

When choosing pairs of tones for each channel, the same tone is not used in more than one pair of tones for a channel on the same fiber (and destined to the same decoder). For example, pairs (1,45) and (12,45) are not chosen to identify two channels on the same fiber to avoid collision of channel signature, and ensure that tones in the pairs are distinctly detected by the decoder. In this way, a channel signature uniquely identifies a channel and also a network parameter associated with the channel.

The decoder 24 compares a combination of tones with the list of expected tone combinations. If the decoded tone combination is not found in the list of expected tone combinations, then the tones comprising a pair are mismatched. In this case, the NMS may generate an alarm for the band to indicate a possible failure for the band.

Thus, a reliable method is provided for identification of a channel and an associated network parameter in an optical network that can accommodate large deviation Frequency Shift Keying (FSK) for Band Routing by selecting a channel tone and a band tone in a unique combination.

It will be apparent that any partition of M blocks of N tones in a block may be used in the method of the fourth embodiment of the invention, for example M=40 and N=40, or M=80 and N=20. Also, any partition of C channel tones per channel group, G channel groups per block, and B band tones per block may be used. Different partitions of M, N, C, G and B may be used, for example, where there are more or less channels in a band, or more or less bands. The following formula may be used to calculate $S_{band}$, the total number of channel signatures for a band, where G=4 channel groups per band:

$$S_{band}=C(N-4C)+(C \text{ CHOOSE } 2)$$

The maximum value of N is found where the derivative of the equation for $S_{band}$ is zero, that is:

$$S_{optimal}=\text{ROUND}((2N-1)/14)$$

In this case, the total number of channel signatures S is given by the formula $$S=(C(2N-1)-7C^2)/2$$

A physical restriction of the methods of embodiments of the invention is associated with the resolution of the detector and is that, when choosing combinations of tones to modulate a channel, any two tones in a channel signature must have a predetermined frequency difference, for example around 1 kHz, in order that each tone can be reliably detected.

The choice of tone pairs in the method according to the fourth embodiment of the invention is further restricted by generation of a unique summary list across the network for a channel in a band, where a summary list is a non-repeating list of all tones used for the first and second tone of all tone pairs used for a channel.

In the method of identification of channels in an optical network according to a fifth embodiment of the invention, the tones comprising a channel signature are selected from the tonespace 46 of 1600 tones without partitioning the tonespace 46. A channel signature comprising a pair of tones identifies a channel only, and is chosen in the following manner. The first tone in the pair is chosen from one of the tones in the tonespace 46. The second tone in the pair is chosen from one of the remaining tones in the tonespace 46. The combination of the first and second tone is used to identify the channel only. The NMS 16 keeps track of the channel signatures assigned to the channel, for all channels.

Table 8 illustrates two example channel signatures for channels one to four.

TABLE 8

| Channel | Example tone pairs |
|---------|--------------------|
| 1 | (1, 2), (3, 4) |
| 2 | (889, 190), (264, 221) |
| 3 | (697, 571), (327, 1367) |
| 4 | (747, 359), (5, 6) |

In a modification to the first embodiment, a channel signature may comprise three or more tones. If the channel signature uses three tones, the tones are selected in the same way as in the selection of tones for the first embodiment, except that three tones are selected from the corresponding block for a channel signature. This increases the number of pairs available for each channel up to (50 CHOOSE 3) or $C_{50}^3$, which is equivalent to (50!/(50-3)!3!), or 19,600 tone pairs. In another modification, when four tones are selected from a block for a channel signature, the number of pairs available for identifying each channel is increasing even further to be equal to (50 CHOOSE 4) or $C_{50}^4$, which is equivalent to (50!/(50-4)!4!), or 230,300 tone pairs. In further modifications, a channel signature comprises five or more tones. Similar modifications may be applied to the second, third and fourth embodiments of the invention. These modifications are used where there are more channels in the network than individual tones available for their identification, or where there are more values of a network parameter associated with a channel to be uniquely identified in the network, or both more channels and more values of associated network parameters.

In modifications to the first embodiment, the associated network parameter may be one of the following: a source node in the network where the channel signature is marked, a destination node in the network where the channel signature is detected, an optical fiber carrying the channel, and an optical cable including the optical fiber carrying the channel. Similar modifications may be applied to the second, third and fourth embodiments of the invention.

In yet another modification to the first embodiment, the tones comprising the channel signature may be encoded onto the channel using one, or a combination of, the following modulation techniques: amplitude modulation, frequency modulation, phase modulation and polarization modulation. Similar modifications may be applied to the second, third and fourth embodiments of the invention.

In a further modification to the first embodiment, the tones comprising the channel signature may be encoded onto the channel simultaneously, consecutively, or by using a combination of simultaneous and consecutive modulation.

In a modification to the third embodiment, the tonespace may be partitioned into three segments. The first two segments comprise 576 tones each, and the third segment comprises 488 tones. Each of the first two segments is further partitioned into 32 blocks of 18 tones in each block. The third segment is partitioned into 32 blocks of 15 tones in each block. In this modification, a pair of tones for channel identification is chosen in the following manner. The first tone in the pair is chosen by selecting a tone from block "I", the "Ith" block, in the first segment, where "I" is the channel number. The second tone is chosen from "Ith" block in the second segment. The number of tone pairs available to identify each channel using a tone from the first segment and a tone from the second segment is 18*18, or 324 tone pairs. The number of tone pairs can be increased to (18*18)+(18*15), or 594 tone pairs, by selecting a first tone from "Ith" block in the first segment, and a second tone from "Ith" block in the second segment, or from "Ith" block in the third segment if the available tone pairs are exhausted by using only the first and second segments. The number of tone pairs can be further increased to (18*18)+(18*15)+(18*15), or 864 tone pairs, by selecting a first tone from "Ith" block in the first or second segment, and a second tone from "Ith" block in the second or third segment, if the available tone pairs are exhausted by using only the first and the second or third segments. In this way, a method for identification of a larger number of channels in an optical network is provided.

In one more modification to the method of fourth embodiment of the invention, two further restrictions are introduced. First, the band tones are chosen so that they are maximally distributed across the tonespace, where the band tones for each band are contiguous. Second, the channel tones in the band are distributed across the tonespace, where there is a frequency spacing of at least 1 kHz between the channel tone and the band tone, and the difference in frequency between a channel tone and another channel tone for the band is maximized. The table shown in FIG. 7 illustrates the selection of tones from the tonespace where C=11, B=36, M=20, N=80. In FIG. 7, the tonespace allocation is a numerical sequence, where the allocation of tones in the tonespace is read from left to right, from top to bottom. For example, the first column in FIG. 7 has the caption "Block 1", labelled 136, and each cell in the first column illustrates the tones for the four channel groups in block 1. The presence of a number in a cell indicates the first tone of four consecutive tones, where each of the four tones is allocated to each of the four channel groups. For example, the fifth cell in column 1, labelled 138, shows the caption "289", indicating that the first four channel tones for channel groups 1, 2, 3, and 4 in block 1 are tones 289, 290, 291 and 292, respectively. The presence of the caption "x" in a cell indicates that no tones are allocated to channel tones in a block in that position in the numerical sequence of tones across the tonespace. For example, the sixteenth cell in column 1, labelled 140, indicates that no channel tones are allocated to block 1 at that point in the numerical sequence. The twentieth cell in column 1, labelled 142, has the caption "1433", indicating that the last four channel tones for channel groups 1, 2, 3, and 4 in block 1 are tones 1433, 1434, 1435 and 1436, respectively. The first cell, labelled 144, in the fourth column has the caption "1", indicating that the first four channel tones for channel groups 1, 2, 3, and 4 in block 4 are tones 1, 2, 3 and 4, respectively. The first cell, labelled 146, in the twentieth column has the caption "65", indicating that the first four channel tones for channel groups 1, 2, 3, and 4 in block 20 are tones 65, 66, 67 and 68, respectively. The last column shows the band tones for each block, it has the caption "Corresp Pool" and is labelled 148. For example, the first cell in the last column, labelled 150, has the caption "Pool 1 69-104", indicating that the 36 band tones for block 1 are tones 69, 70, 71, and so on, to tone 104.

The remaining steps to select channel signatures in this modification to the method of the fourth embodiment are identical to that of the fourth embodiment.

Although specific embodiments of the invention have been described in detail, it will be apparent to one skilled in the art that variations and modifications to the embodiments may be made within the scope of the following claims.

What is claimed is:

1. A method for identifying an optical channel in an optical network, comprising the steps of:
   marking the channel with a unique combination of two or more identification tags, the combination of identification tags being referred to as a channel signature, to identify the channel in the network;
   detecting the channel signature at various locations in the network; and
   verifying one or more restrictions imposed on the allocation of tones for the channel signature in the network, the step of verifying being performed before the step of marking.

2. A method as described in claim 1, wherein the step of verifying the restrictions comprises verifying that the tones in the channel signature are selected so that the frequency difference between any two tones in the channel signature is not less than a predetermined frequency spacing.

3. A method as described in claim 2, wherein the step of verifying that the tones in the channel signature are selected so that the frequency difference between any two tones in the channel signature is not less than a predetermined frequency spacing comprises selecting the predetermined frequency spacing from a range of frequency spacings from about 1 Hz to about 100 Hz.

4. A method as described in claim 2, wherein the step of verifying that the tones in the channel signature are selected so that the frequency difference between any two tones in the channel signature is not less than a predetermined frequency spacing comprises selecting the predetermined frequency spacing from a range of frequency spacings from about 8 Hz to about 10 Hz.

5. A method as described in claim 1, wherein the step of verifying the restrictions comprises verifying that channel signatures for different channels in the network are chosen so that, for channels destined to the same decoder in the network, a list of individual tones used in the channel signatures of said channels includes each tone only once.

6. A method as described in claim 1, further comprising the steps of:
   maintaining a list of all tones to be used for channel signatures in the network;
   releasing tones in unique combinations for use as channel signatures in the network; and
   keeping track of tones available for further allocation to channel signatures in the network.

7. A system for identifying an optical channel in an optical network, comprising:
   means for marking the channel with a unique combination of two or more identification tags, the combination of identification tags being referred to as a channel signature, to identify the channel in the network;
   means for detecting the channel signature at various locations in the network; and
   means for verifying one or more restrictions imposed on the allocation of tones for the channel signature in the network.

8. A system as described in claim 7, wherein the means for verifying comprises one or more of the following:
   means for verifying that the tones in the channel signature are selected so that the frequency difference between any two tones in the channel signature is not less than a predetermined frequency spacing; and
   means for verifying that channel signatures for different channels in the network are chosen so that, for channels destined to the same decoder in the network, a list of individual tones used in the channel signatures of said channels includes each tone only once.

9. A system as described in claim 7, further comprising:
   means for maintaining a list of all tones to be used for channel signatures in the network;
   means for releasing tones in unique combinations for use as channel signatures in the network; and
   means for keeping track of tones available for further allocation to channel signatures in the network.

10. A method for identifying an optical channel in an optical network, comprising the steps of:
   marking the channel with a unique combination of two or more identification tags, the combination of identification tags being referred to as a channel signature, to uniquely identify the channel in the network and one or more network parameters associated with the channel; and
   detecting the channel signature at various locations in the network;
   wherein the step of marking the channel comprises allocating one of the tones in the channel signature for identifying the channel, and allocating one or more of the remaining tones in the channel signature for identifying one or more parameters in the network associated with the channel.

11. A method as described in claim 10, wherein the step of marking the channel comprises allocating two or more tones in the channel signature for identifying the channel, and allocating one or more of the remaining tones in the channel signature for identifying one or more parameters in the network associated with the channel.

12. A method as described in claim 11, wherein the step of allocating the remaining tones comprises allocating the tones for identifying one or more of the following network parameters associated with the channel:
    (a) an optical band including the channel;
    (b) a source node in the network where the channel signature is marked;
    (c) a destination node in the network where the channel signature is detected;
    (d) an optical fiber carrying the channel; and
    (e) an optical cable including the optical fiber carrying the channel.

13. A method as described in claim 10, wherein the step of marking comprises marking the channel with the channel signature comprising a pair of two dither tones.

14. A method as described in claim 13, wherein the step of marking the channel with the channel signature comprising the pair of two dither tones includes allocating one of the tones in the pair to identify the channel wavelength, and allocating the other tone in the pair to identify one of the following network parameters:
    (a) an optical band including the channel;
    (b) a source node in the network where the channel signature is marked;
    (c) a destination node in the network where the channel signature is detected; and
    (d) an optical fiber carrying the channel.

15. A method as described in claim 14, further comprising the step of selecting a plurality of unique pairs of tones, each tone in each pair being selected from a tonespace comprising a limited number of tones, and each pair of tones uniquely identifying the channel and the associated parameter in the network.

16. A method as described in claim 15, wherein the step of selecting comprises the steps of:
    partitioning the tonespace into M blocks, each block comprising N tones; and
    selecting the two tones in the pair from the same block, the tones in the block being used to uniquely identify one channel and the associated parameter in the network.

17. A method as described in claim 15, wherein the step of selecting comprises the steps of:
    partitioning the tonespace into a first and second segments;
    partitioning each segment into M blocks; and
    selecting one tone in the pair from a block from the first segment, and the other tone in the pair from a block from the second segment.

18. A method for identifying an optical channel in an optical network, comprising the steps of:
    marking the channel with a unique combination of two or more identification tags, the combination of identification tags being referred to as a channel signature, to uniquely identify the channel in the network and one or more network parameters associated with the channel; and
    detecting the channel signature at various locations in the network;
    wherein the step of allocating the remaining tones comprises allocating the tones for identifying one or more of the following network parameters associated with the channel:
    (a) an optical band including the channel;
    (b) a source node in the network where the channel signature is marked;
    (c) a destination node in the network where the channel signature is detected;
    (d) an optical fiber carrying the channel; and
    (e) an optical cable including the optical fiber carrying the channel.

19. A method for identifying an optical channel in an optical network, comprising the steps of:
    marking the channel with a unique combination of two or more identification tags, the combination of identification tags being referred to as a channel signature, to uniquely identify the channel in the network and one or more network parameters associated with the channel;
    detecting the channel signature at various locations in the network; and
    verifying one or more restrictions imposed on the allocation of tones for the channel signature in the network, the step of verifying being performed before the step of marking.

20. A method as described in claim 19, wherein the step of verifying the restrictions comprises verifying that the tones in the channel signature are selected so that the frequency difference between any two tones in the channel signature is not less than a predetermined frequency spacing.

21. A method as described in claim 20, wherein the step of verifying that the tones in the channel signature are selected so that the frequency difference between any two tones in the channel signature is not less than a predetermined frequency spacing comprises selecting the predetermined frequency spacing from a range of frequency spacings from about 1 Hz to about 100 Hz.

22. A method as described in claim 20, wherein the step of verifying that the tones in the channel signature are selected so that the frequency difference between any two tones in the channel signature is not less than a predetermined frequency spacing comprises selecting the predetermined frequency spacing from a range of frequency spacings from about 8 Hz to about 10 Hz.

23. A method as described in claim 19, wherein the step of verifying the restrictions comprises verifying that channel signatures for different channels in the network are chosen so that, for channels destined to the same decoder in the network, a list of individual tones used in the channel signatures of said channels includes each tone only once.

24. A method as described in claim 19, further comprising the steps of:
    maintaining a list of all tones to be used for channel signatures in the network;
    releasing tones in unique combinations for use as channel signatures in the network; and
    keeping track of tones available for further allocation to channel signatures in the network.

* * * * *